United States Patent

Ogino et al.

[11] Patent Number: 5,611,611
[45] Date of Patent: Mar. 18, 1997

[54] REAR PROJECTION TYPE DISPLAY SYSTEM

[75] Inventors: Masanori Ogino, Yokohama; Yoshiaki Iwahara, Yokosuka; Shoji Kuroda, Odawara; Shuichi Sakamoto, Yokohama; Takashi Itoh, Hiratsuka; Makoto Kamiya, Yokohama, all of Japan

[73] Assignee: Hitachi, Ltd., Tokyo, Japan

[21] Appl. No.: 401,253

[22] Filed: Mar. 9, 1995

[30]     Foreign Application Priority Data

Oct. 5, 1994  [JP]  Japan .................................. 6-241037
Oct. 26, 1994  [JP]  Japan .................................. 6-262205

[51] Int. Cl.⁶ .............................................. G03B 21/60
[52] U.S. Cl. ......................... 353/74; 359/457; 359/456; 359/454
[58] Field of Search .................................. 353/38, 74, 75, 353/76; 359/454–457; 348/744

[56]              References Cited

U.S. PATENT DOCUMENTS

| Re. 33,795 | 1/1994 | Ogino | 353/74 |
| 4,725,134 | 2/1988 | Ogino | 353/74 |
| 4,961,642 | 10/1990 | Ogino | 353/74 |
| 5,296,922 | 3/1994 | Mitaui et al. | 359/457 |
| 5,400,114 | 3/1995 | Yoshida et al. | 359/457 |
| 5,485,308 | 1/1996 | Hirata et al. | 359/457 |
| 5,513,036 | 4/1996 | Watanabe et al. | 353/77 |
| 5,513,037 | 4/1996 | Yoshida et al. | 359/457 |

FOREIGN PATENT DOCUMENTS

| 0148529 | 7/1985 | European Pat. Off. . |
| 0167039 | 1/1986 | European Pat. Off. . |
| 0490391 | 6/1992 | European Pat. Off. . |
| 58-59436 | 4/1983 | Japan . |
| 60-263932 | 12/1985 | Japan . |
| 1017471 | 1/1966 | United Kingdom . |

Primary Examiner—William Dowling
Attorney, Agent, or Firm—Antonelli, Terry, Stout & Kraus, LLP

[57]                  ABSTRACT

A rear projection type display system with a transmissive screen. A transparent reinforcing plate is coupled to a lenticular sheet of the screen on the light output side by a connective member to broaden the horizontal diverging angle by 60 degrees or more to the right and left sides. The duty factor of a black stripe formed on the lenticular sheet is set to 60% or more so improve the contrast of an image. The diverging angle at each point of a vertically-diffusing lens for diverging light in the vertical direction is modulated in accordance with the height of each point to offer a proper visual angle range in the vertical direction.

9 Claims, 17 Drawing Sheets

REAR PROJECTION TYPE DISPLAY SYSTEM

BACKGROUND OF THE INVENTION

1. Field of the Invention

The present invention relates to a high precision rear projection type display system having an improved contrast and horizontal directivity and a broadened vertical field of view.

2. Description of the Related Art

FIG. 1 shows the structure of a conventional rear projection type display with a single projection lens. In FIG. 1, reference numeral 1 represents a color CRT as an original image forming means, reference numeral 2 represents a projection lens means, and reference numeral 3 represents a transmissive screen means.

FIG. 2 shows the structure of a conventional transmissive screen. For the details of its operation principle, refer to JP-A-58-59436, U.S. Pat. No. 4,725,134, U.S. Pat. No. Re. 33,795 and JP-A-60-263932. All disclosures of each of the above publications is incorporated herein by reference. Reference numeral 4 represents a Fresnel sheet for transforming divergent incident light beams to parallel beams, and reference numeral 5 represents a lenticular sheet for diverging light beams in the horizontal direction.

FIG. 3A is an enlarged partial plan view in cross section of the lenticular sheet 5. Reference numeral 6 represents the lenticular lens surface formed on the light input side, reference numeral 7 represents an ambient light absorbing stripe, reference numeral 8 represents a light transmissive part, and reference numeral 4' (refer to FIG. 2) represents a lenticular lens surface for diverging light beams in the vertical direction. Reference numeral 9 represents light beams diverged in the range of about 40 degrees to the right and left sides, reference numeral 10 and 10' represent light beams which are to be diverged in the range of about 50 degrees or more to the right and left sides.

The above-described conventional technique has at least the following three problems.

(1) As illustrated in FIG. 3A, in order to improve an image contrast, the width T of the light transmissive part 8 is required to be as narrow as possible, about 40% or less of the array pitch W of the lenticular lens 6 (a T/W ratio is called a duty factor of light transmission). However, with this settings, the light beams 10, 10' which are to be diverged in the range of about 50 degrees or more to the right and left sides are intercepted by the black stripes 7 as shown in FIG. 3A. The conventional technique is therefore associated with a problem that an image cannot be observed in the range of 50 degrees or more to the right and left sides if a contrast is to be improved.

(2) The lenticular sheet 5 is generally made of transparent methacrylic resin by extrusion roller molding. In order to display a high precision image on a screen having a diagonal length of about 50 inches (1 m width, and 0.75 m height), the array pitch W of the lenticular lens 6 is required to be about 0.4 mm or less, and the thickness of the lenticular sheet 5 is required to be about 0.6 mm or less. Problems to be caused by a precision limit of extrusion roller molding will be explained with reference to FIGS. 4A and 4B. Reference numerals 5, 6, 7, and 8 in FIGS. 4A and 4B represent similar elements to those shown in FIG. 3A. In the examples shown in FIGS. 4A and 4B, the edge of the light transmissive part 8 at its light output surface is made round because of an insufficient molding precision. The thickness of the lenticular sheet 5 shown in FIG. 4A is too smaller than a designed value, whereas the thickness of the lenticular sheet 5 shown in FIG. 4B is too larger than the designed value. Light beams 14, 14' have insufficient diverging angles to the right and left sides because of the round edges, and light beams 15, 15' indicate a total reflection at the light output surface. It is therefore difficult for the conventional technique to manufacture a screen of high quality and high precision.

(3) The inventor has found another problem that a lenticular sheet having a thickness of about 0.6 mm or less tends to buckle down by its weight. This case is illustrated in the vertical cross sectional view of FIG. 3B. Reference numerals 60 and 60' represent a screen frame for supporting the screen with torque, and reference numeral 5 represents a buckled lenticular sheet.

Analysis results of an Euler's bucking formula are given below.

$$\frac{t}{l} > \frac{\sqrt{12}}{2\pi} \sqrt{\frac{F_2}{E}} \approx 0.55 \sqrt{\frac{F_2}{E}} \quad (1)$$

$t$: thickness $E \approx 200$ kg/mm² (Young's modulus)

$l \approx 0.75$ m (screen height)

$F_2 \approx 0.5\, m_3 l$ (pressure at screen half height) $\quad (2)$ $m_3 \approx 1.2$ g/cm³ (density)

$\therefore F_2 = 0.45$ g/mm²

$\therefore t/l > 0.00083$ $$\therefore t > 0.55 \sqrt{\frac{0.5 m_3 l}{E}} \ l \approx 0.62 \text{ mm} \quad (3)$$

The formula (1) is a general Euler's bucking prevention formula, and the formula (2) is a self-weight pressure.

As seen from the above formulas, an occurrence of the self-weight bucking phenomenon is theoretically proved for a 50-inch screen having a lenticular sheet of 0.62 mm thick or less.

Another problem of the conventional technique is a limited contrast of about 160:1 or less because of flares at the connective portion between the projection lens means 2 and the original image forming means 1 even when room illuminating ambient light is completely shut (even when a room light is turned off). A contrast visually and psychologically detectable by human eyes is about 300:1. It has been therefore desired to further improve a contrast.

Still another problem of the conventional technique is that an image contrast is lowered by reflection of a room illuminating ambient light on the screen if the light is very bright.

Another example of the structure of a conventional rear projection type display is shown in FIG. 5. In FIG. 5, reference numeral 101 represents a screen, reference numeral 102 represents a projection lens, reference numeral 103 represents an original image forming surface, reference numeral 104 represents an original image forming means, reference numeral 105 represents an output amplifier, reference numeral 106 represents a pre-amplifier, and reference numeral 107 represents an image signal input terminal. If the display is a CRT, the original image forming surface 103 is a face plate of CRT, and if the display is a liquid crystal display, it is a liquid crystal panel.

An example of the structure of a conventional transmission type screen is shown in FIG. 6. In FIG. 6, reference numeral 108 represents a Fresnel sheet, reference numeral 109 represents a vertically light-diverging lenticular sheet, reference numeral 110 represents a horizontally light-diverging lenticular sheet, reference numeral 112 represents a vertically micro-light-diverging lenticular lens surface having a pitch of about 80 μm, reference numeral 111 represents a macro-light-converging Fresnel lens surface having a pitch of about 100 μm, reference numeral 113 represents a horizontally micro-light-diverging lenticular lens surface having a pitch of about 500 μm, and reference numeral 114 represents a black stripe surface. FIG. 7 is an enlarged cross sectional view of one pitch of the sheet 10. The light propagation direction is indicated by a solid line with arrows. Reference numeral 114' represents a light transmissive part, and reference numeral 114" represents a black strip part. A light diverging particle layer is generally provided to one of the sheets 8, 9, and 10. For the detailed explanation of FIGS. 6 and 7, refer to the above-cited U.S. Pat. No. 4,725,134 proposed by the present inventor.

FIGS. 8 and 9 are graphs showing the horizontal and vertical directivities of the screen shown in FIG. 7. A proper visual range is generally defined to be the angular range with a relative brightness of ⅓ or higher. This angular range is called a diverging angle in this embodiment. With the conventional technique, as seen from FIGS. 8 and 9, the horizontal diverging angle is about in excess of 90 degrees and the vertical diverging angle is about 20 degrees, which angles are constant over the whole screen. The gain of this screen is about 6.

These screen characteristics are sufficient for a current television system using about 250 scan lines per one field, but insufficient for a computer display having 1000 or more scan lines. The reason for this will be clarified in the following.

FIG. 10 shows a vertical directivity and a proper visual range of a conventional screen. Reference numeral 115 represents an output side conjugate point of a conventional screen.

A center beam of light beams outputted from each point on the screen propagates toward this conjugate point 115. H is an effective height of the screen. A solid line with an arrow indicates the light propagating direction, the range at the inside of oblique lines is a proper visual range.

In the case of a screen of a general television system, it is known that the distance from the screen to each viewer, i.e., a proper visual range, is 3 H to 8 H. The proper visual range shown in FIG. 10 contains this range from 3 H to 8 H. Therefore, this range is suitable for a screen of a general television system.

In the case of a screen of a computer display having 1000 or more scan lines, however, a user monitors the screen at the position nearer to the screen than a general television. FIG. 11 illustrates this case. Reference numeral 116 indicates the distribution of eye positions. It is desired that a shortest distance is about 1 H. To meet this requirement, the conventional technique has intensified the vertically light-diverging lenticular lens 112 shown in FIG. 6 uniformly to broaden the vertical diverging angle shown in FIG. 9 about twice (about 40 degrees). However, this approach lowers the screen gain by about one half and the brightness at each point on the whole screen by about one half, posing a problem of difficulty in viewing an image on the screen due to the lowered brightness. If a light source power is doubled in order to compensate for the degraded brightness, a power consumption becomes great and it takes an additional cost for heat dissipation.

SUMMARY OF THE INVENTION

It is an object of the present invention to provide a back projection type display system with a good contrast capable of solving the above-described problems associated with the conventional technique.

It is another object of the present invention to provide a transmission type screen having a broad horizontal diverging angle of 50 degrees or more to the right and left sides and having an improved horizontal directivity.

It is still another object of the present invention to provide a transmission type screen capable of eliminating a self-weight bucking trouble.

It is a further object of the present invention to extend application fields of a back projection type display.

It is a still further object of the present invention to provide a projection type display whose vertical diverging angle is modulated by a vertical position of the screen.

It is another object of the present invention to provide a projection type display having a function of compensating at least part of a relative brightness change of the screen to be caused by modulation of the vertical diverging angle.

In order to achieve the above objects, in one embodiment of the invention, a transmissive type screen includes reinforcing means and connective means in addition to a Fresnel sheet and a lenticular sheet. In a modification of the embodiment, the screen further includes polarizer means.

In another embodiment of the invention, flare preventing means is disposed between original image forming means and projection lens means, the flare preventing means including polarizer means and quarter wavelength plate means.

In another embodiment of the invention, polarizer means is used for preventing a contrast from being lowered by room illuminating ambient light.

In another embodiment of the invention, conductive film means is attached to reinforcing plate means of the transmissive type screen In another embodiment of the invention, a mounting method of a large size screen having a diagonal length of 100 inches or more is provided.

The reinforcing plate means (transparent) is coupled by the connective means (transparent) to the lenticular sheet on the light output side, while removing any air layer. The refractive indices of the reinforcing plate means and the connective means are set to have a refractive index difference of 0.1 or less from that of the lenticular sheet. An increase of an interface reflection loss can be therefore avoided. The sine of a diverging angle of light passing through the connective means can be reduced by about 1/1.5.

It is therefore possible to reduce a loss of light intercepted by a black stripe more than the conventional technique, and to have a horizontal diverging angle of 50 degrees or more to the right and left sides in the air.

The duty factor at the light transmissive part can be set to 40% or less, and the duty factor at the black stripe part can be set to 60% or more which is far better than the conventional duty factor of 40%, thereby improving a contrast. The horizontal diverging angle is not adversely affected by a variation of the thickness of a lenticular sheet resulting from a variation of molding conditions, because of the refractive indices of the reinforcing plate means and the connective means matching the refractive index of the lenticular sheet. The polarizer means of the modification absorbs illuminating ambient light by about 50%, preventing the contrast from being lowered.

With the flare preventing means, light partially reflected by the projection lens means is prevented from returning back to the original image forming means, because the polarized plane of light is rotated by 90 degrees. It is therefore possible to prevent the contrast from being lowered by flares.

The polarization direction of the polarizer means for room illuminating ambient light is set perpendicular to that of polarizer means in the transmissive type screen. The room illuminating ambient light is therefore absorbed by the polarizer means in the transmissive type screen so that the contrast can be improved.

The conductive film means is connected to the electronic system of the projection type display so that electrostatically charged dusts are prevented from attaching to the screen and hence the contrast degradation to be caused by dusts can be avoided. A man-machine interface technique may be applied by using the screen with such conductive film means like a pen-input lap top computer, improving an easy-to-use function.

With the embodiment mounting method, a plurality of lenticular sheets are juxtaposed on, and coupled to, the bottom surface of the reinforcing plate means having a width twice or more of that of each lenticular sheet, by using the connective means. A large size screen having a size in excess of a maximum width of a lenticular sheet to be manufactured can therefore be assembled with ease. Application fields of a rear projection type display can therefore be broadened.

In another embodiment of the invention achieving the object of changing the vertical diverging angle at each point on a screen in the vertical direction, there is provided a transmissive type screen having pitch-modulating lenticular lens means for diverging light in the vertical direction.

In another embodiment of the invention, light density modulating means is provided for modulating a light density on an original image forming surface.

The array pitch of the pitch-modulated lenticular lens means at the area where a broadest vertical diverging angle is required, is set to be 1.2 time or more of the array pitch near at the area where a narrowest vertical diverging angle is required. The diverging angle of the lenticular lens means is generally proportional to the array pitch because the lenticular lens means is formed by disposing a number of lens elements having a similar profile in a one-dimensional direction. The vertical diverging angle at the area where the broadest vertical diverging angle is required, can therefore be broadened by about 1.2 time.

The light density modulating means increases the light density on the original image forming surface at the area where a broadest converging angle is required. It is therefore possible to at least partially compensate for a lower brightness at the area where the broadest converging angle is required.

If the original image forming surface is constituted by a CRT face plate, a light density can be modulated by controlling the intensity of an electron beam by using an electronic circuit. Specifically, the gain of a video signal amplifier is controlled synchronously with a vertical scan. If the original image forming surface is constituted by a liquid crystal panel, the light density may be modulated by two methods. With the first method, the gain of an image signal is controlled in the similar manner described above. With the second method, the intensity of light incident to the liquid panel is optically controlled. A combination of the first and second methods may also be used.

DESCRIPTION OF THE PREFERRED EMBODIMENTS

Figure 12:
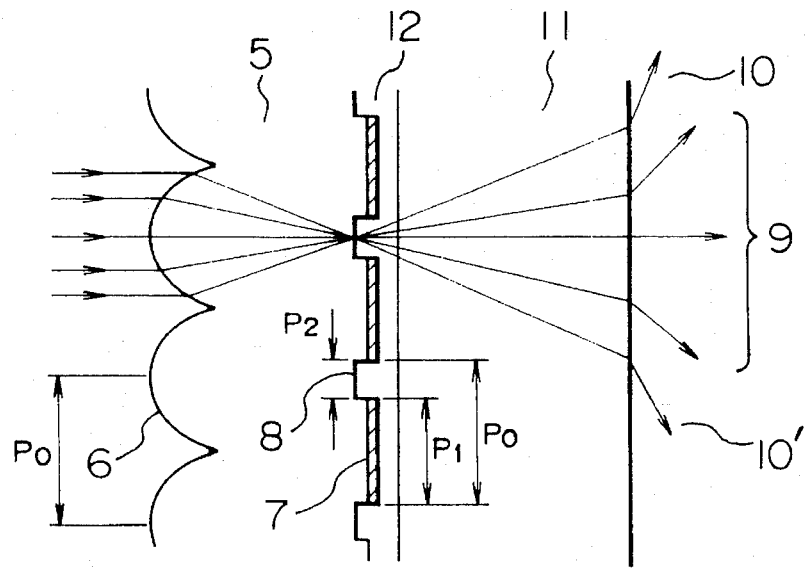
FIG. 12 is an enlarged schematic partial plan view in cross section showing an embodiment of a lenticular sheet and a transparent reinforcing plate of a screen used by a display of this invention.

The main part of a fundamental embodiment is shown in FIG. 12. In this figure, reference numeral 5 represents a lenticular sheet, reference numerals 6, 7, and 8 represent a lenticular lens surface, a black stripe part, and a light transmissive part, respectively.

Reference numeral 11 represents a transparent reinforcing plate means of this invention. The total thickness of the transparent reinforcing plate means and the lenticular sheet is set to satisfy the already described formulas (1) and (2). Reference numeral 12 represents a transparent connective means of this invention. The refractive indices of both the means 11 and 12 are set to have a difference of about 0.1 from the refractive index of about 1.5 of the lenticular sheet 5.

As a material of the connective means 12, an acrylic resin based adhesive agent, silicon gel, or the like may be used.

As a material of the reinforcing plate means 11, glass, methacrylic resin, styrene resin, polycarbonate resin, or the like may be used.

The connective means may be formed by the steps of:

(1) printing black stripes 7 on the lenticular sheet 5 on the light output side;

(2) coating the connective means 12 on the lenticular sheet 5 on the light output side;

(3) adhering the processed lenticular sheet to the reinforcing plate means 11, while pressuring the reinforcing plate means 11 and the processed lenticular sheet by a roller or the like so as to make them in tight contact with each other and prevent an air layer and foams from being entered therebetween; and (4) curing the connective means 12 by applying ultraviolet rays to it or placing it in a high temperature atmosphere.

The diverging angle of light passing through the light transmissive part 8 of the display shown in FIG. 12 and constructed as above can be maintained about 40 degrees or less ($\sin^{-1}1/1.5$). It is therefore possible to prevent light from being intercepted by the black stripe 7. In FIG. 12, reference numeral 9 represents light beams diverged in the range of about 40 degrees to the right and left sides, and reference numerals 10 and 10' represent light beams diverged outside of the range of about 50 degrees to the right and left sides.

Figure 13A:
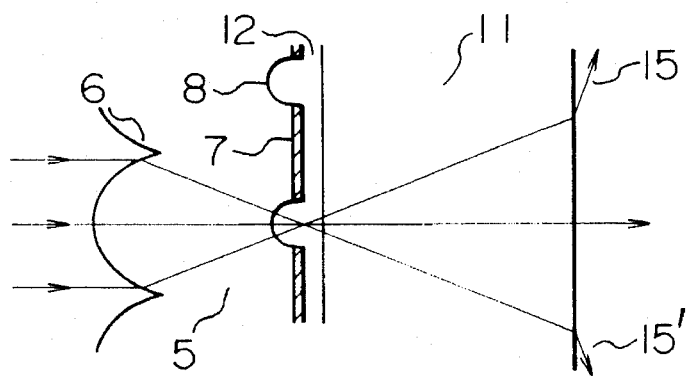
FIGS. 13A and 13B are diagrams explaining the effects of the lenticular lens sheet and transparent reinforcing plate shown in FIG. 12.
Figure 13B:
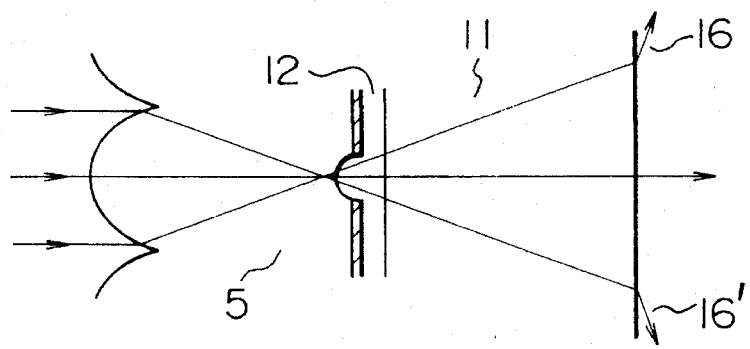

FIG. 13A shows a lenticular sheet 5 having a small thickness, and FIG. 13B shows a lenticular sheet 5 having a large thickness. Both the lenticular sheets 5 have the duty factor $D_{f2}=P2/P0$ of 40% or less at the light permissive part 8 which is rounded because of an insufficient molding precision. Reference numerals 15, 15', 16, and 16' represent light beams having a diverging angle of 50 degrees to the right and left sides.

As seen from FIG. 12 and FIGS. 13A and 13B, the display constructed as above has the following advantageous effects:

(1) A horizontal diverging angle of about 50 degrees or more to the right and left sides can be obtained. It is therefore possible to view an image from all corners of a room.

(2) A requirement for a precision of a molding apparatus can be relieved. The manufacturing yield can therefore be improved and a cost effective display can be realized.

(3) The duty factor $D_{f1}$ at the black stripe can be increased to 60% or more so that a contrast can be improved, i.e., $D_{f1}=P1/P0>60\%$ where P0 is a pitch (array pitch) of the lenticular lens 6 and a pitch of the black strip 7, and P1 is a width of the black stripe. P2 in FIG. 12 is a width of the light permissive part 8.

(4) Assuming that the average refractive index is 1.5 and a refractive index difference is 0.1, the reflectivities R at the interfaces between the lenticular sheet 5 and the connective means 12 and between the connective means 12 and the reinforcing plate means 11 have as small a level as about 0.1%. It is therefore possible to prevent the contrast from being degraded.

$$R=[(n_1-n_2)/(n_1+n_2)]^2 \approx (0.1/3)^2 \approx 0.1\% \qquad (4)$$

where $n_1$ and $n_2$ are refractive indices of optical media.

(5) Since the output surface of the reinforcing plate means 11 is flat, a reflection preventing film (not shown) may be formed on this flat surface to facilitate to improve the contrast. Furthermore, color filtering material such as neodium atoms (Nd) may be mixed in the reinforcing plate means to transmit main wavelength components such as red, green, and blue and absorb other intermediate color components, so that a color purity and contrast can be improved. Although it is very difficult to mix Nd in the lenticular sheet requiring the high precision during a molding process, mixing Nd in a reinforcing plate means not requiring a high precision is easy.

Light attenuating material such as neodium or carbon atoms may be mixed in the medium of the transparent reinforcing plate means 11 to improve a contrast although a light propagation efficiency is lowered more or less.

This invention is not applicable to a display system which uses three primary color projection tubes disposed horizontally and three projection lenses (a general type projection type display recently used in this technical field), because such a projection type display system requires to mount a color shift reducing lenticular lens surface on the lenticular sheet at its light output side. The invention is applicable only to a particular system such as a single projection lens type system or a three-color vertical in-line disposal type system.

Figure 14:
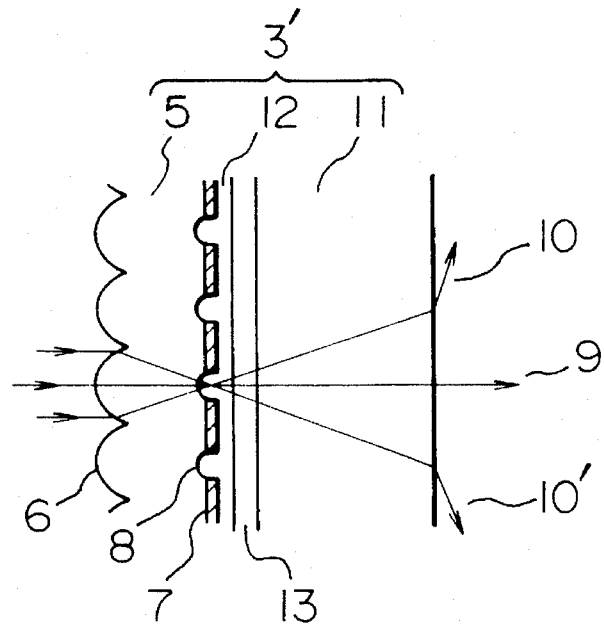
FIG. 14 shows another embodiment of a lenticular lens sheet and a transparent reinforcing plate.

The fundamental embodiment shown in FIG. 12 has been described. Next, a modification of the fundamental embodiment will be described with reference to FIG. 14. Reference numerals other than 13 shown in FIG. 14 represent like elements to those shown in FIG. 12 and FIGS. 13A and 13B. Reference numeral 13 represents a polarizer for transmitting only horizontally polarized components (of the light electric field).

Addition of the polarizer reduces the brightness of a projected light beam by about one half. However, it can prevent a contrast from being degraded by room illuminating ambient light. This effect can be further enhanced by combining this modification to each of the structures shown in FIGS. 15, 17, and 18 which will be later described.

Figure 34:
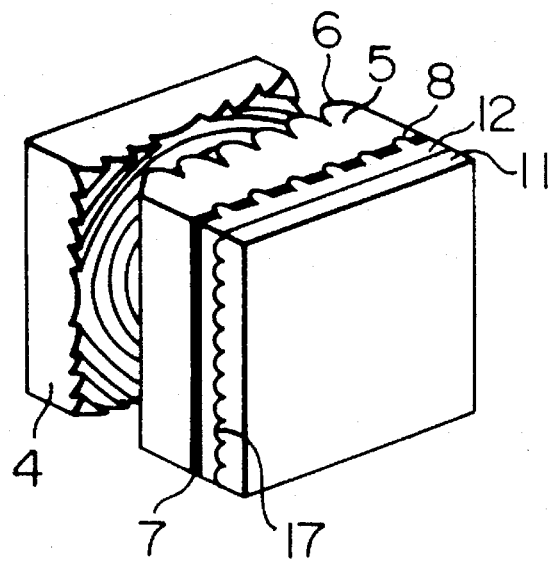
FIG. 34 is a perspective view showing another embodiment of a screen of this invention.

FIG. 34 illustrates another embodiment of the invention. In this figure, reference numerals 4, 5, 6, 7, 8, 11, and 12 represent those elements already described. Reference numeral 17 represents a vertically-diffusing lenticular lens means for diverging light by +/−5 degrees of more in the vertical direction. This means 17 is formed on the input side of the transparent reinforcing plate means 11 prior to the already described assembly of the plate means 11 and the lenticular sheet 5 by the connective means 12. A method of calculating a maximum prism angle necessary for the lens portion of the vertically-diffusing lenticular lens means 17 will be described with reference to FIG. 35 (showing an optical path) and the following equation.

$$\tan\theta = -\frac{\sin\gamma}{n_2 \sin\cos^{-1}\left(\frac{\sin\gamma}{n_2}\right) - n_1} \tag{5}$$

Figure 35:
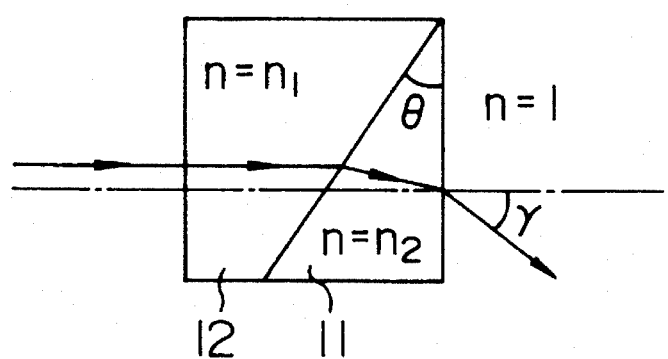
FIG. 35 is a schematic diagram showing an optical path for the design of a prism angle.

In FIG. 35 and the above equation, $n_2$ represents an index of refraction of the transparent reinforcing plate means 11, and $n_1$ represents an index of refraction of the connective means 12. Assuming that $n_2 \approx 1.6$ and $n_1 \approx 1.5$, $\theta$ is about 42 degrees in order to have a diverging angle $\gamma$ of 5 degrees or larger according to the above equation. Therefore, the light diverging angle $\gamma$ of +/−5 degrees can be obtained by forming the profile of each vertically-diffusing lenticular lens 17 in the shape of an arc having a fan-angle of about +/−42 degrees or larger.

The vertically-diffusing lenticular lens 17 assembled in an integral structure shown in FIG. 34 is not exposed in the air. Therefore, a reflection at its interface can be suppressed to about 0.1% or less according to the equation (4). A desired vertically-diffusing angle can be obtained without degrading a contrast. The description of the embodiment shown in FIG. 34 has thus been completed.

Figure 15:
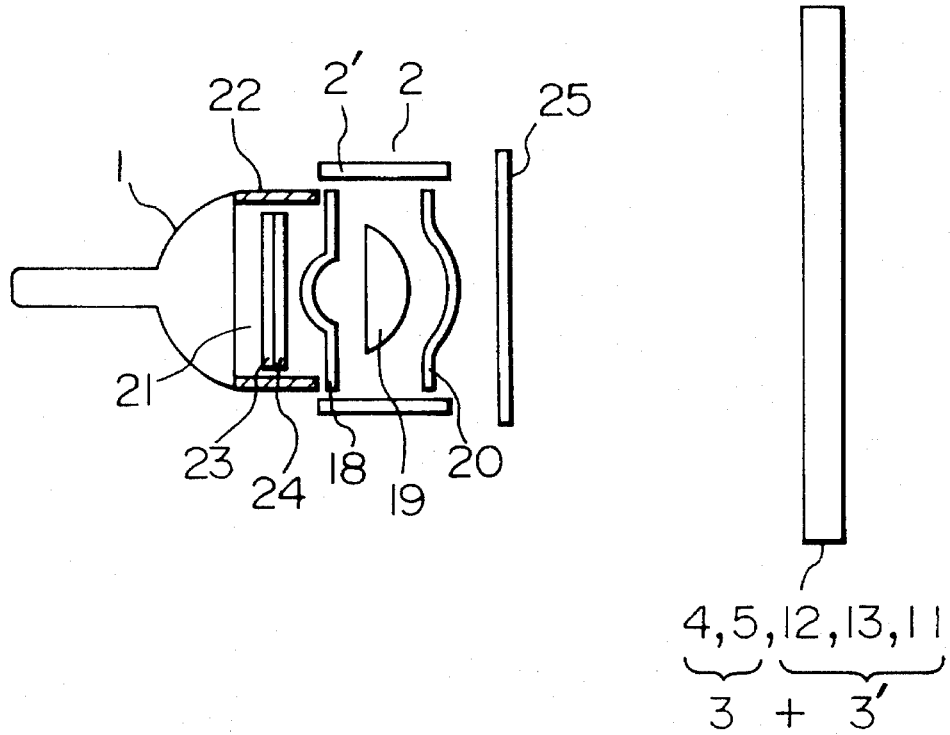
FIG. 15 is a schematic diagram showing the structure of another embodiment of a display of this invention.

FIG. 15 illustrates another embodiment of the invention. Reference numerals 1, 2, and 3' represent like elements to those described earlier.

Reference numeral 2', represents a barrel of the projection lens means 2, reference numerals 18, 19, and 20 represent lens elements constituting the projection lens means 2, reference numeral 21 represents a coolant solution, reference numeral 22 represents a container for the coolant solution, reference numeral 23 represents a polarizer means for passing only horizontally polarized components, and reference numerals 24 and 25 represent quarter wavelength plate means having fundamental axes of birefringence inclined by 45 degrees from the horizontal plane. The polarizer means 23 and the quarter wavelength plate means 24 constitute a flare eliminating means of the invention. It is effective to use the quarter wavelength plate means 25 with the polarizer means 14 shown in FIG. 14.

The structure of the display system shown in FIG. 15 has been described above. Next, the operation principle of this system will be described with reference to FIG. 16.

Figure 16:
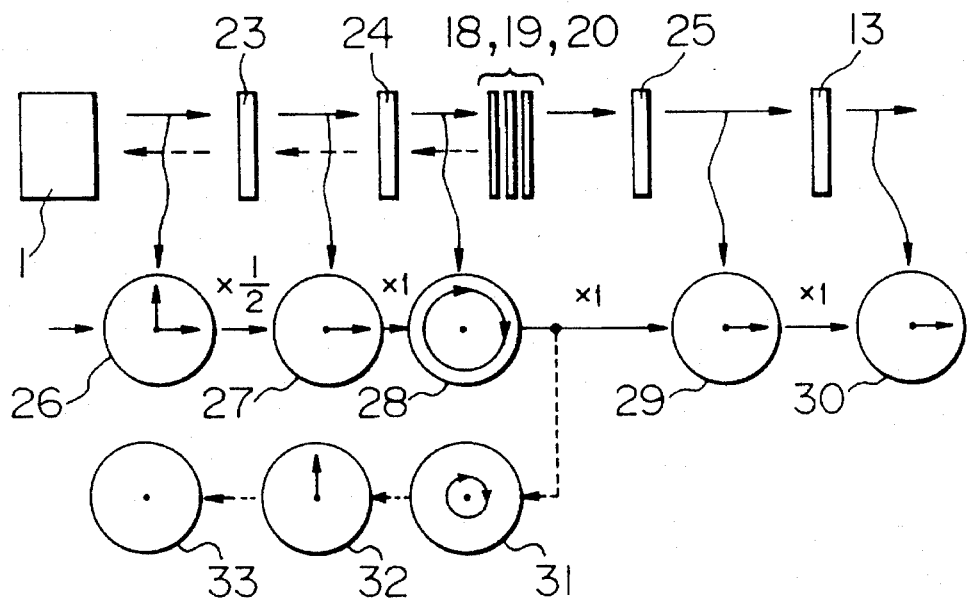
FIG. 16 is a diagram explaining the operation of eliminating the adverse effects by flares in the display shown in FIG. 15.

In FIG. 16, the polarization directions of electric field components of light are indicated at 26 to 33. Light projected from the original image forming means have both vertical and horizontal components as indicated at 26. Only the horizontally polarized components are derived by the polarizer means 23 as indicated at 27. The horizontally polarized wave is changed to a circularly polarized wave by the quarter wavelength plate means 24 as indicated at 28. The circularly polarized wave is changed to a horizontally polarized wave by the quarter wavelength plate means 25 as indicated at 29. The horizontally polarized wave is outputted as the same horizontally polarized wave from the polarizer means 13 of the screen as indicated at 30. Light partially reflected at the interfaces of the lens elements 18, 19, and 20 becomes flares as indicated at 31. The flares are changed to a vertically polarized wave by the quarter wavelength plate mans 24 as indicated at 32. Only the horizontally polarized components pass through the polarizer means 23 and the vertically polarized components are intercepted, so that the flares are intercepted as indicated at 33.

Flares are prevented from returning back to the original image forming means 1 so that the contrast of an image is not degraded. The description with reference to FIGS. 15 and 16 has thus been completed.

Figure 17:
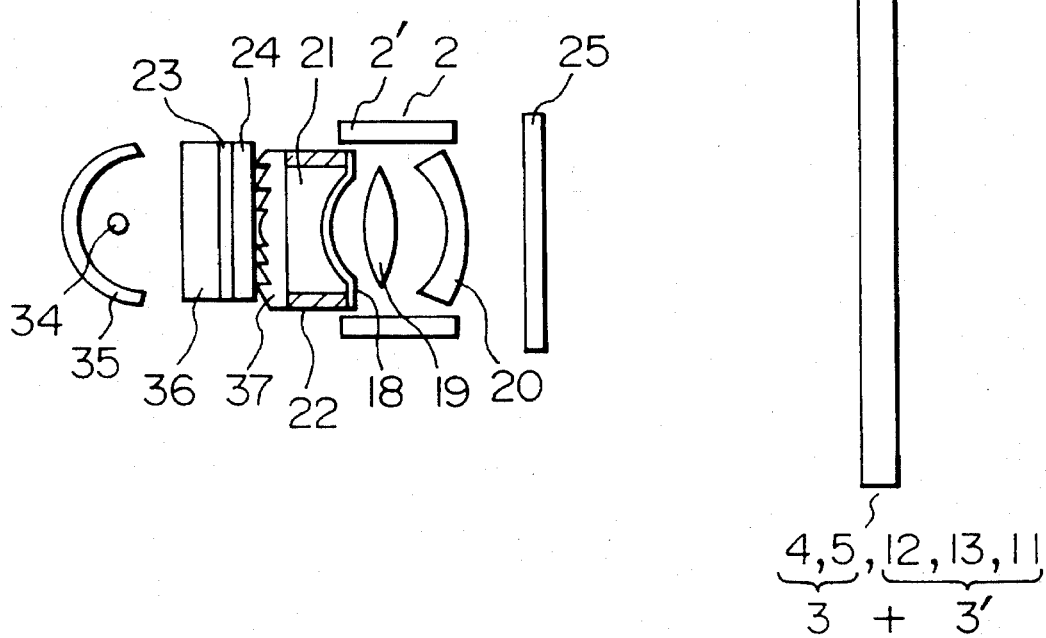
FIG. 17 is a schematic diagram showing the structure of another embodiment of a display of this invention.

Next, a modification of the above embodiment will be described with reference to FIG. 17. Reference numerals 2, 2', 3', 18, 19, 20, 21, 22, 23, 24, and 25 represent like elements to those shown in FIG. 15. Reference numeral 34 represents a white light projection source, reference numeral 35 represents a reflection mirror, reference numeral 36' represents a liquid crystal panel as the original image forming means, and reference numeral 37 represents a light converging Fresnel lens. The operation principle of this display system is similar to the display system shown in FIG. 16, and so the description thereof is omitted.

Figure 18:
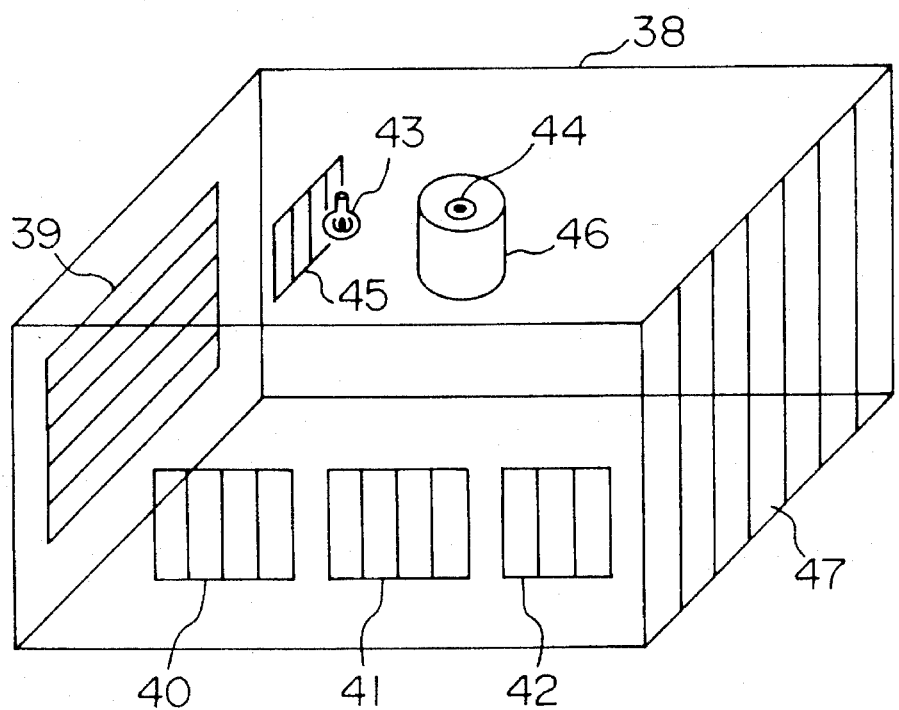
FIG. 18 is a schematic diagram showing the structure of another embodiment of a display of this invention.

Another embodiment of the invention is illustrated in FIG. 18. Reference numeral 38 represents a presentation room. Reference numeral 39 represents a transmission screen of the invention described earlier which is mounted on the wall of the presentation room and includes a polarizer for passing only horizontally polarized components. Reference numerals 40, 41, and 42 represent windows for introducing external light each being mounted with a vertical polarizer. Reference numerals 43 and 44 represent a room illuminating light source, and reference numerals 45 and 46 represent a polarizer for passing only vertically polarized components. Reference numeral 47 represents a vertical polarizer constituting the wall of the presentation room.

The description of the structure shown in FIG. 18 has thus been completed. Next, the operation principle of this embodiment will be described with reference to FIG. 19. Curves 48 and 49 indicate the interface reflectivities of an S wave and a P wave. This graph is formed by assuming that a refractive index of each of non-metallic substances constituting the room is about 1.5. The S wave has a polarization direction in parallel with an interface, and the P wave has a polarization direction (direction of electric field vector) in a plane (input plane) defined by a normal of an interface and a light propagation direction.

Figure 19:
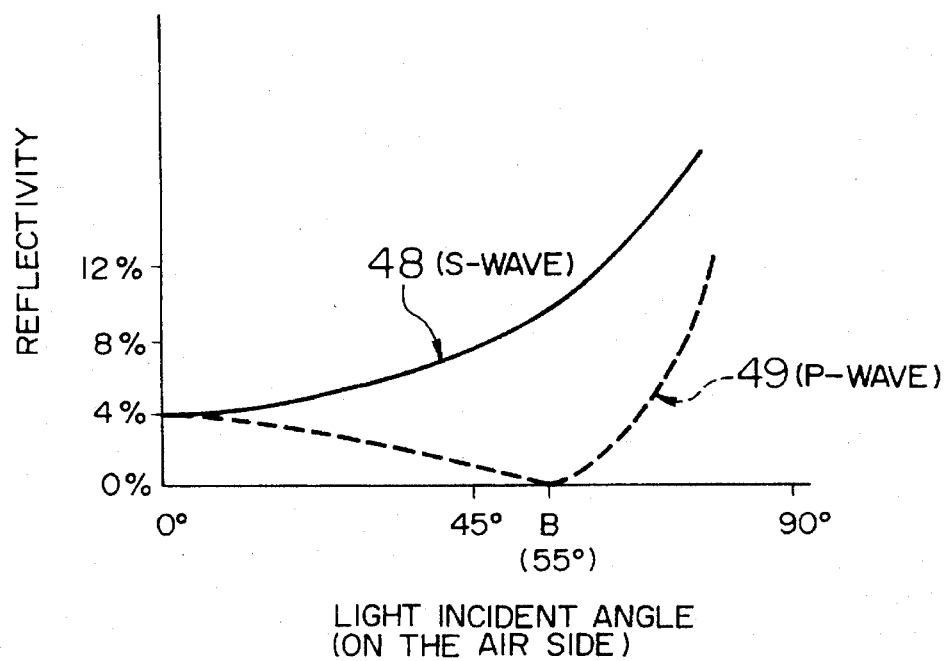
FIG. 19 is a graph explaining the reflection indices of the embodiment shown in FIG. 18.

As shown in FIG. 19, the reflectivity of a P wave becomes zero at a so-called Brewster angle ($\tan^{-1}1/1.5$: about 55 degrees). The reflectivity of a P wave is always smaller than that of an S wave. The surface of a document placed on a desk of the presentation room is horizontal. Therefore, the S wave is a horizontally polarized wave relative to the document, and the P wave is a vertically polarized wave relative to the document. If only the vertically polarized components of room illuminating light are arranged to propagate to a far field, glares on the document can be eliminated. The arrangement shown in FIG. 18 therefore makes it easy to read the document on the desk. External ambient light reaching the screen 39 is mainly vertically polarized components only which are absorbed by a horizontally polarized wave transmissive polarizer means 13 in the screen. It is therefore possible to minimize a degradation of a contrast of an image on the screen. The description with reference to FIGS. 18 and 19 has thus been completed.

Figure 20:
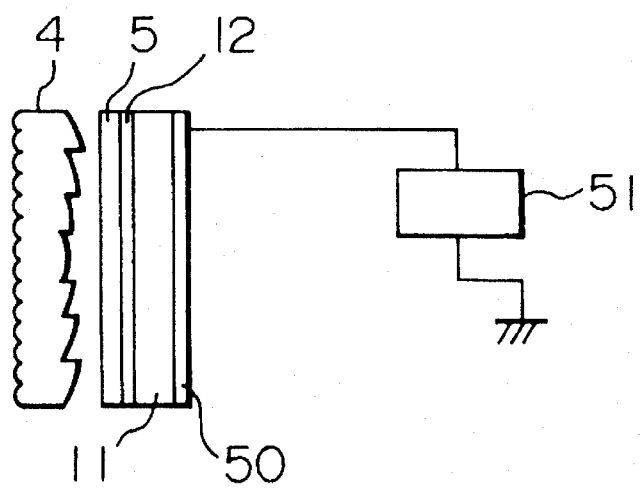
FIG. 20 is a schematic diagram showing the structure of another embodiment of a display of this invention.

Another embodiment of the invention is illustrated in FIG. 20 which is a vertical cross sectional view of a transmission type screen. Reference numeral 50 represents a conductive film means formed on the reinforcing plate means 11 at the light output side. The material of the conductive film means 50 may be Indium Tin Oxide. Reference numeral 51 represents an electronic system for the projection type display. The conductive film means 50 is grounded via the electronic system 51 so that the screen is prevented from being charged by static electricity, the velocity of dusts accumulated on the surface of the screen is lowered, and the contrast degradation is alleviated. A man-machine interface technique may be applied by using the screen with such a conductive film like a pen-input lap top computer, improving an easy-to-use function (for example, the screen can be used in the manner like a black board or a white board on which characters and graphics can be hand-written).

Figure 21:
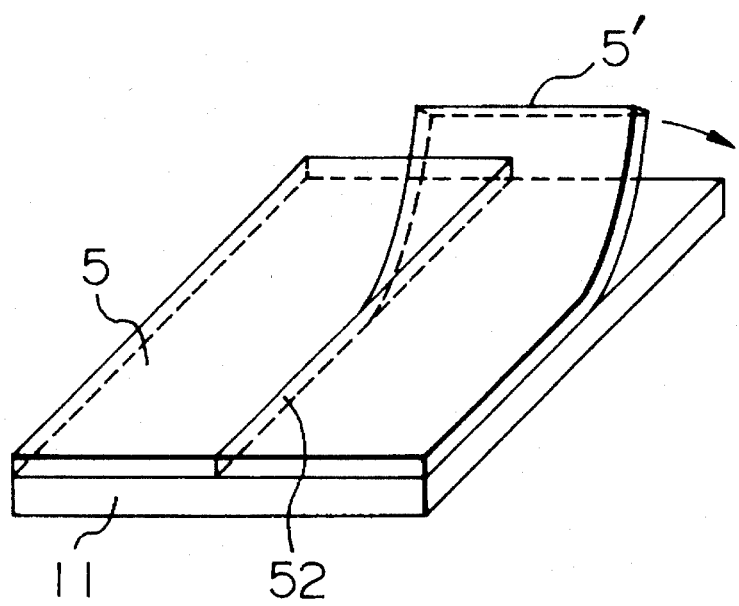
FIG. 21 is a perspective view explaining a method of mounting a lenticular lens sheet of a display of this invention.
Figure 22:
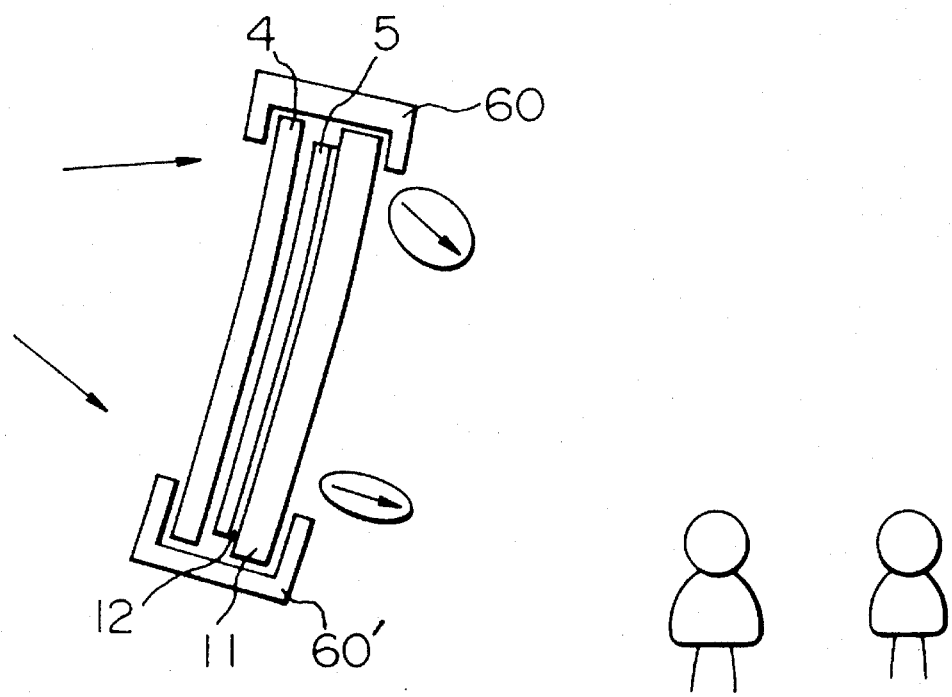
FIG. 22 is a side view explaining a method of mounting a screen of a display of this invention.

FIGS. 21 and 22 are diagrams explaining a mounting method for a large size screen having a diagonal length of about 100 inches or more.

In FIG. 21, reference numeral 11 represents a transparent reinforcing plate means having a width of about 2 m or more and a thickness of about 3 mm. Reference numerals 5 and 5' represent lenticular sheets having a width of about 1. A connective means (not shown) is coated in advance on the output side surface of each of the lenticular sheets 5 and 5' which are then placed on the reinforcing plate means 11 at the input side to thereby assemble a large size screen.

With the conventional technique, the lenticular sheets are bonded together also at opposing side walls 52. This difficult work is not required in this invention, and the assembly work becomes easy.

FIG. 22 is a vertical cross sectional view of a large size screen tilted forward by about 7 degrees. Reference numerals 60 and 60' represent a screen support frame, reference numeral 4 represent a Fresnel sheet having a thickness of about 2 mm or less, reference numeral 5 represents a lenticular sheet having a thickness of about 0.5 mm, reference numeral 12 represents a connective means having a thickness of about 0.2 mm, and reference numeral 11 represents a transparent reinforcing plate means having a thickness of about 3 mm.

Figure 23:
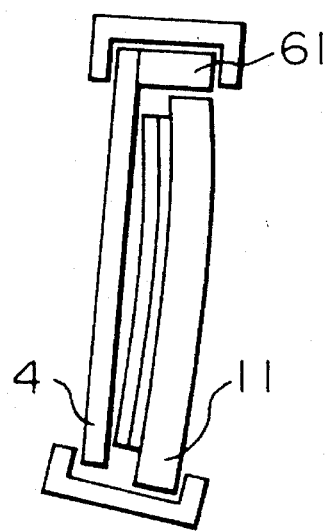
FIG. 23 is a side view explaining another method of mounting a screen of a display of this invention.

With this structure, the Fresnel sheet 4 and the lenticular sheet 5 can be made in tight contact with each other by their own weights. FIG. 23 illustrates a modified mounting method. Reference numeral 61 represents a rectangular column bonded to the upper portion of a Fresnel sheet 4 to apply the weight of the Fresnel sheet 4 to the top end of a reinforcing plate 11, preventing the bucking of the Fresnel sheet 4.

Figure 1:
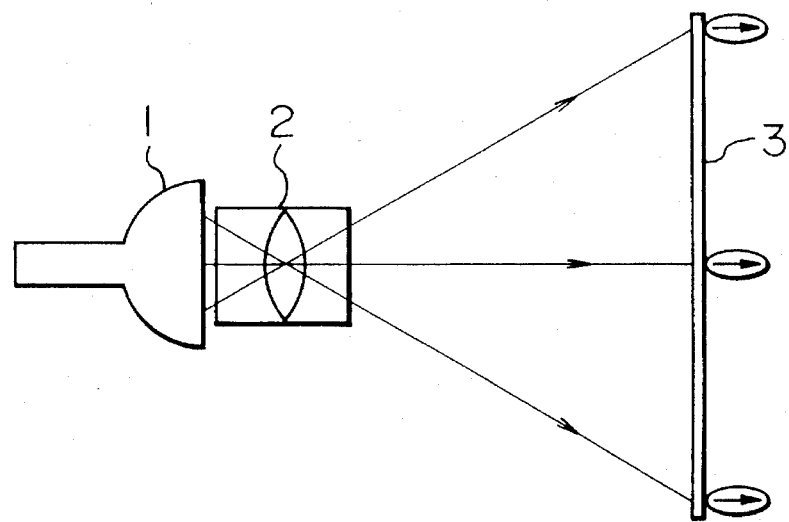
FIG. 1 is a schematic diagram showing the structure of a general projection type display using a single projection lens.
Figure 2:
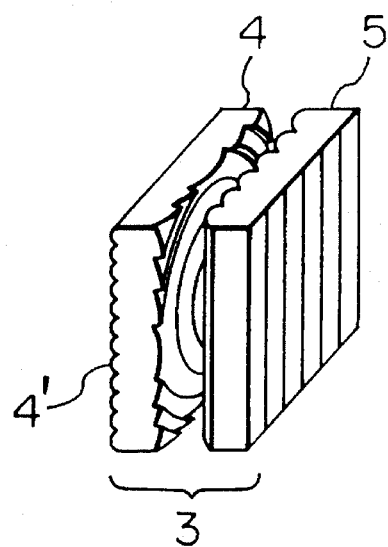
FIG. 2 is a perspective view showing the structure of a conventional transmission type screen used by the display shown in FIG. 1.
Figure 3A:
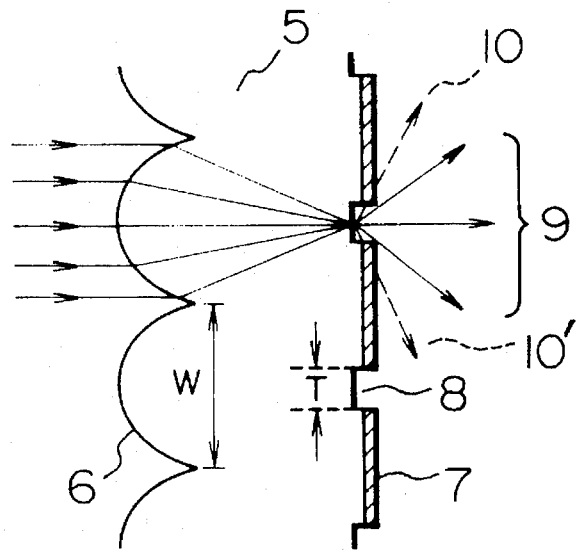
FIGS. 3A and 3B are diagrams explaining the problems associated with the screen shown in FIG. 2.
Figure 3B:
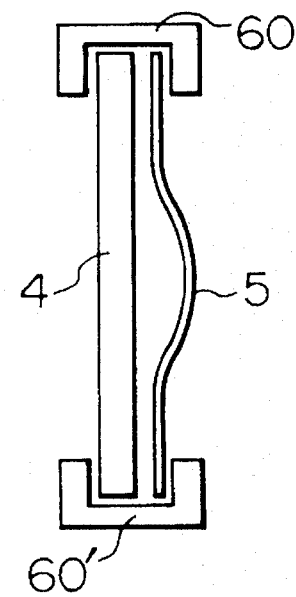
Figure 4A:
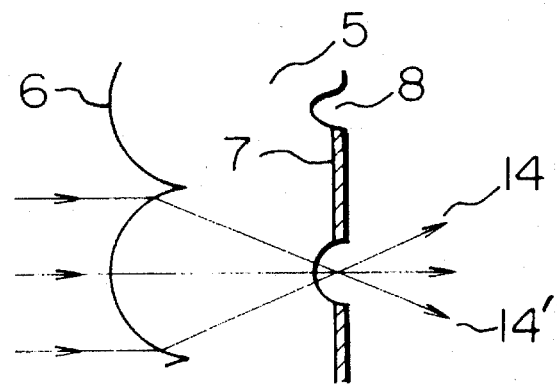
FIGS. 4A and 4B are diagrams explaining the problems associated with the screen shown in FIG. 2.
Figure 4B:
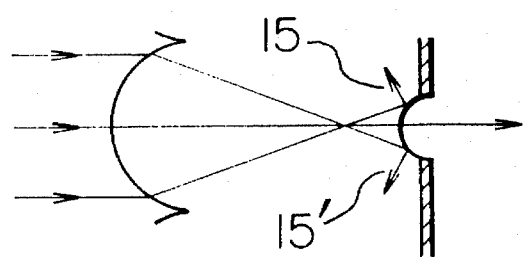
Figure 5:
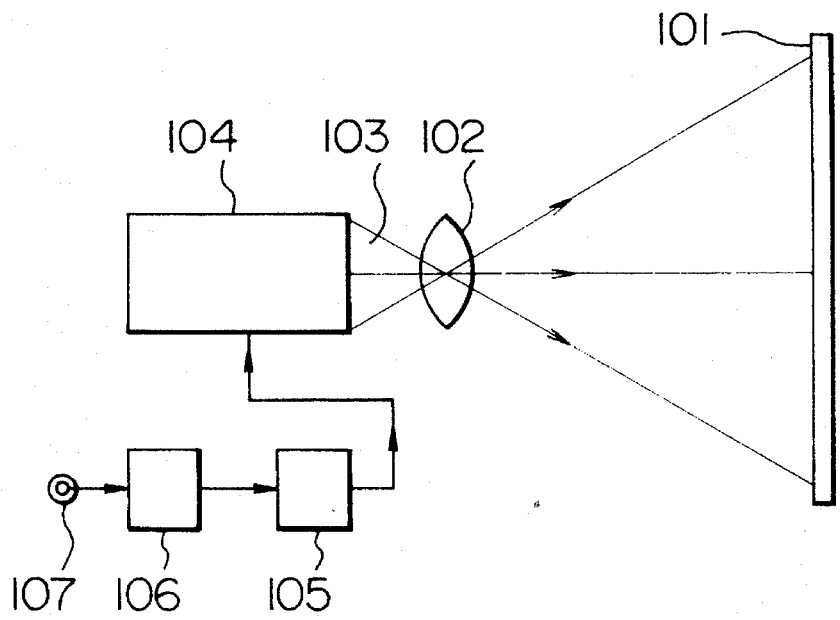
FIG. 5 is a schematic diagram showing another general projection type display using a single projection lens.
Figure 6:
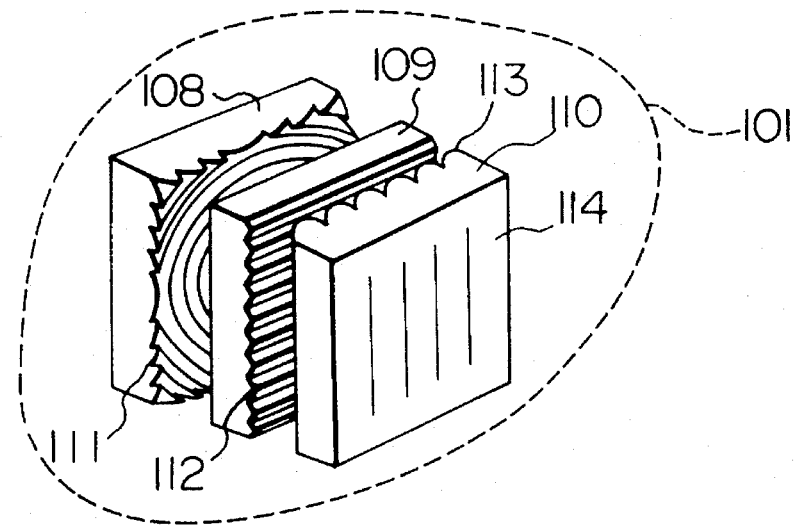
FIG. 6 is a perspective view showing the structure of a conventional transmission type screen used by the display shown in FIG. 5.
Figure 7:
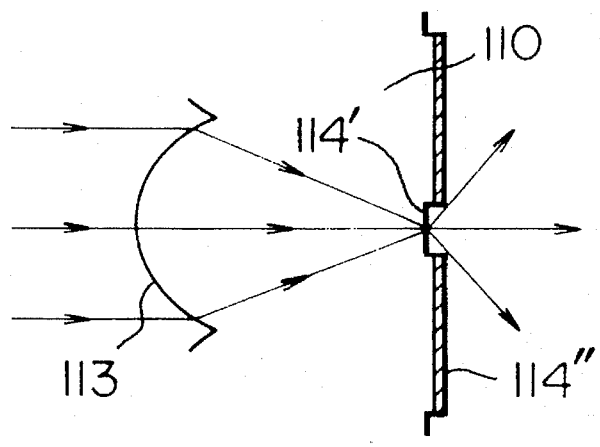
FIG. 7 is a diagram explaining the problems associated with the screen shown in FIG. 6.
Figure 8:
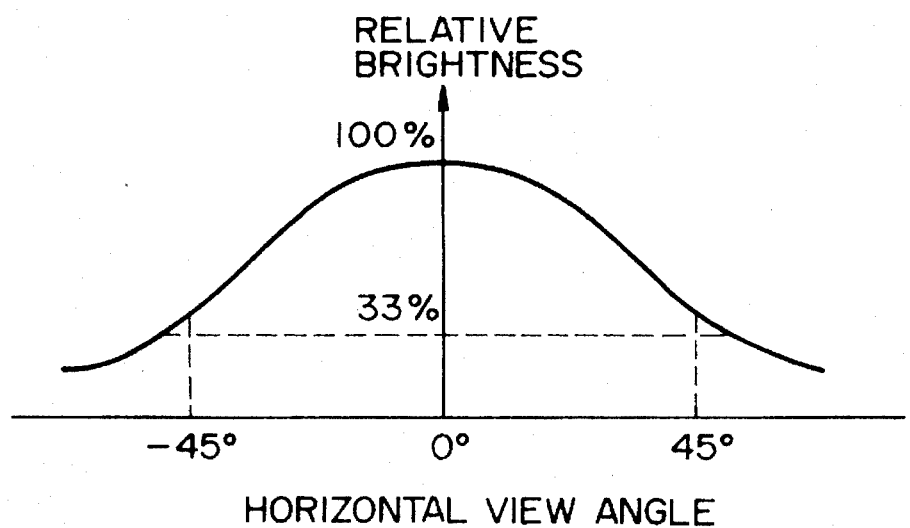
FIG. 8 is a graph showing a relative brightness of the screen shown in FIG. 6.

Another embodiment of a screen of this invention illustrated in FIG. 24 will be described. Reference numerals other than 112' represent like elements to those shown in FIG. 6. Reference numeral 112' represents a pitch-modulated lenticular lens means whose enlarged cross sectional view is shown in FIG. 25. The vertical diverging angles are indicated by v1 to v4. The vertical diverging angles v1 and v2 take a contact value of about 20 degrees from the bottom end of the screen to the half height thereof. The vertical diverging angle v3 is about 30 degrees, and the diverging angle v4 at the top end of the screen is about 40 degrees. The array pitch of the lenticular lens at the screen area (near top end) where the broadest diverging angle is necessary, is set about twice that at the screen area (bottom end to half height). In practical use, if this diverging angle ratio is set to about 1.2 time or more, the brightness degradation can be suppressed considerably. The characteristic feature of this invention is to set the diverging angle ratio to 1.2 time or more.

Figure 25:
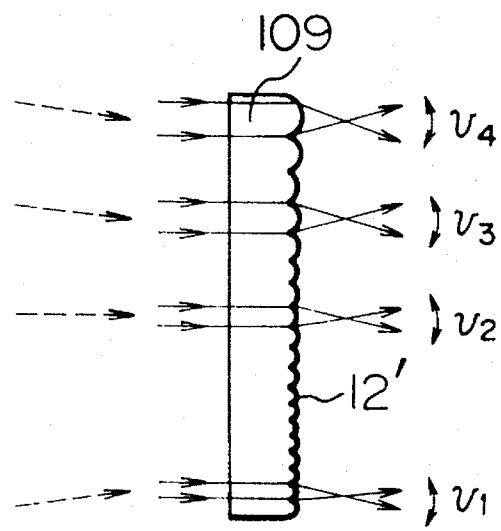
FIG. 25 is a side view of the pitch-modulated vertical lenticular lens sheet shown in FIG. 24.
Figure 26:
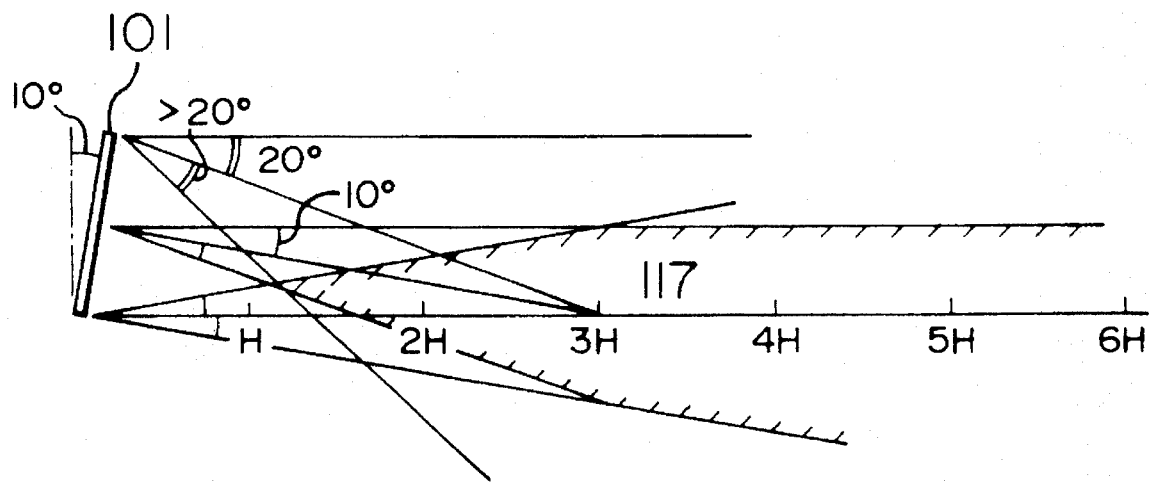
FIG. 26 is a diagram explaining a proper visual range of the display using the screen shown in FIG. 24.

The proper visual range of the screen of FIG. 25 is illustrated in FIG. 26. The conjugate point of the Fresnel lens 111 shown in FIG. 25 on the light output side is at a position 117 having a distance of 3 H from the screen 101. Center beams from each point on the screen propagate toward this conjugate point 117. The screen 101 is being tilted forward by about 10 degrees.

Figure 11:
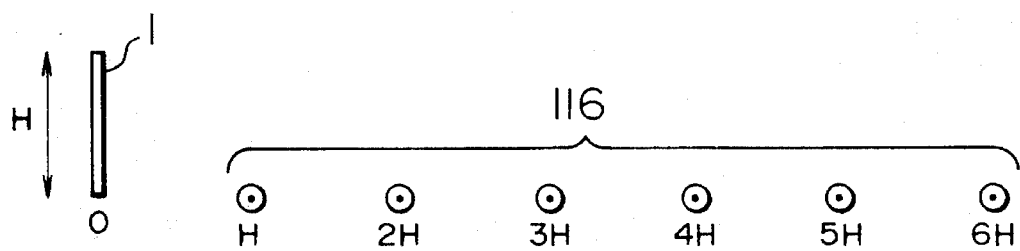
FIG. 11 is a diagram explaining the distribution of proper viewers for the display shown in FIG. 5.

As shown in FIG. 26, the vertical diverging angle at the top end of the screen is 20 degrees to the upper and lower sides, 40 degrees in total (diverged to the lower side more than 20 degrees because of nonlinearity according to the Snell laws), and the vertical diverging angle at the screen area from the bottom end to the half height is 10 degrees to the upper and lower sides, 20 degrees in total. The region surrounded by oblique lines corresponds to the proper visual range. As understood by referring to FIG. 11, the embodiment screen is suitable for use with a high resolution computer display.

The cross section of the pitch-modulated lenticular lens means 112' shown in FIG. 25 may be of a convex lens shape, a concave lens shape, a cylindrical lens shape, or a higher order curved lens shape. The maximum diverging angle of a cylindrical lens is about 40 degrees. If a hyperbolically curved lens is used, the maximum diverging angle can be made broader. The description of the embodiment shown in FIG. 24 has thus been completed.

Figure 27:
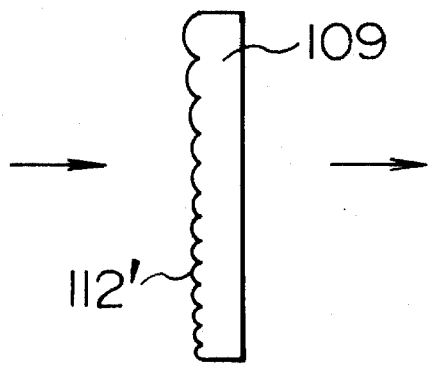
FIG. 27 is a side view showing another embodiment of a lenticular lens sheet of the invention.

A modification of this embodiment is illustrated in FIG. 27. In this modification, a pitch-modulated lenticular lens means 112' is formed on the light output side, as opposed to that shown in FIG. 24. The other elements are the same as those shown in FIG. 24.

Figure 28:
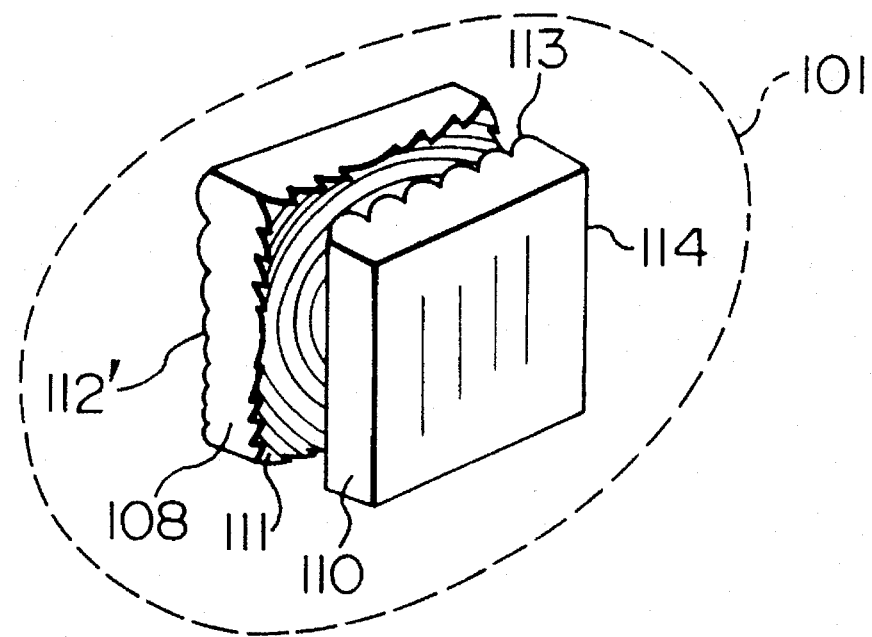
FIG. 28 is a perspective view showing another embodiment of a screen used by a display of this invention.

Another modification of the screen is illustrated in FIG. 28. In this modification, the sheet 109 shown in FIG. 24 is omitted, and a pitch-modulated lenticular lens means 112' is formed on the light input side of a Fresnel sheet 108. Although the number of screen constituent elements can be reduced by this modification, the lower side diverging angle is likely to become broader than the upper side diverging angle at the top end of the screen, so that this modification is preferably applied to specific applications.

A modification of the screen of this invention suitable for application to a so-called multi-screen having two or more sub-screens stacked one upon another, is illustrated in FIG. 28. The conjugate point of a Fresnel lens 111 on the light output side is often set to an infinite point in the case of a general multi-screen. It is desired to ensure a continuity of the vertical directivity characteristics at the boundary between the fist and second stage sub-screens. A modification of the screen suitable for use as the sub-screen at the upper stage is illustrated in FIG. 29.

Figure 29:
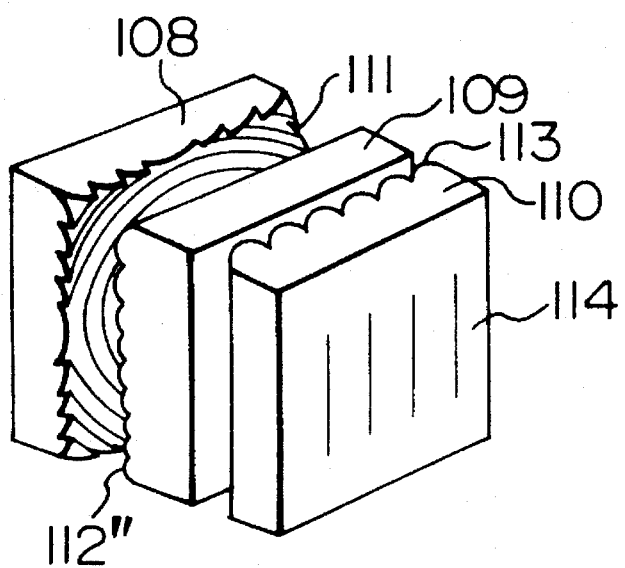
FIG. 29 is a perspective view showing another embodiment of a screen used by a display of this invention.
Figure 30:
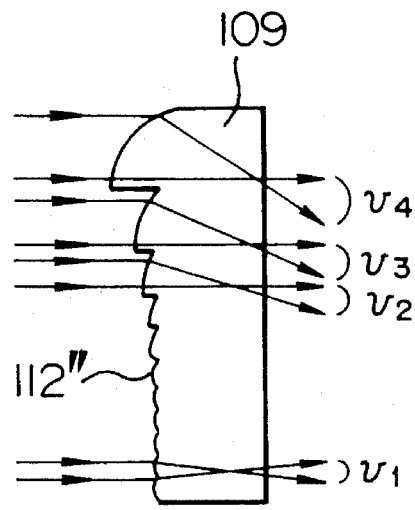
FIG. 30 is a side view showing another embodiment of a lenticular lens sheet of this invention.

In FIG. 29, elements other than a pitch-modulated lenticular lens means 112" are similar to those described earlier. FIG. 30 is an enlarged cross sectional view of the sheet 109. In FIG. 30, the vertical diverging angles are indicated at v1, v2, v3, and v4, having a broader angle in the reverse order recited. This lenticular lens surface is realized by substantially forming only one halves of consecutive lenticular lens elements at the area near the largest pitch. The profile of each lenticular lens element may be of a shape partially approximating a cylindrical shape or an ellipsoidal shape by straight line segments. If the longer axis of an ellipse is aligned with the normal direction of the screen and its eccentricity is set to a middle between 1 and an inverse of the refractive index of optical medium, this screen is made effective for the applications which require flat and uniform vertical directivity characteristics.

Figure 9:
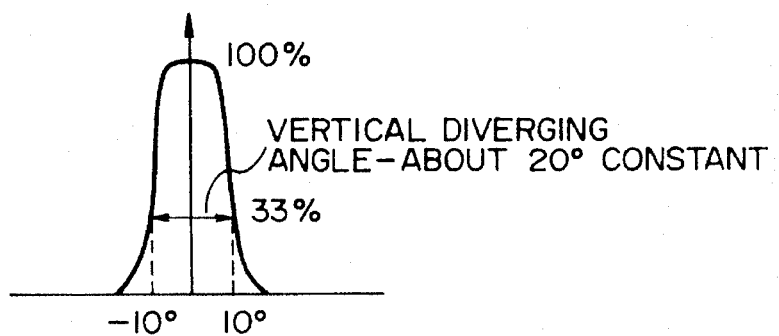
FIG. 9 is a graph showing a vertical diverging angle of the screen shown in FIG. 6.
Figure 10:
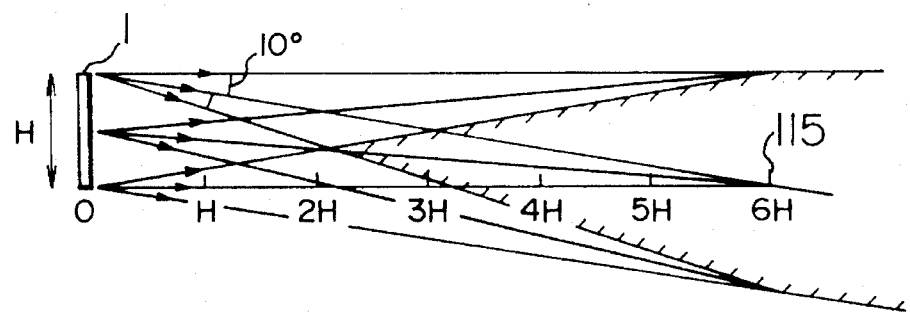
FIG. 10 is a diagram explaining a proper visual range of the display shown in FIG. 5.
Figure 24:
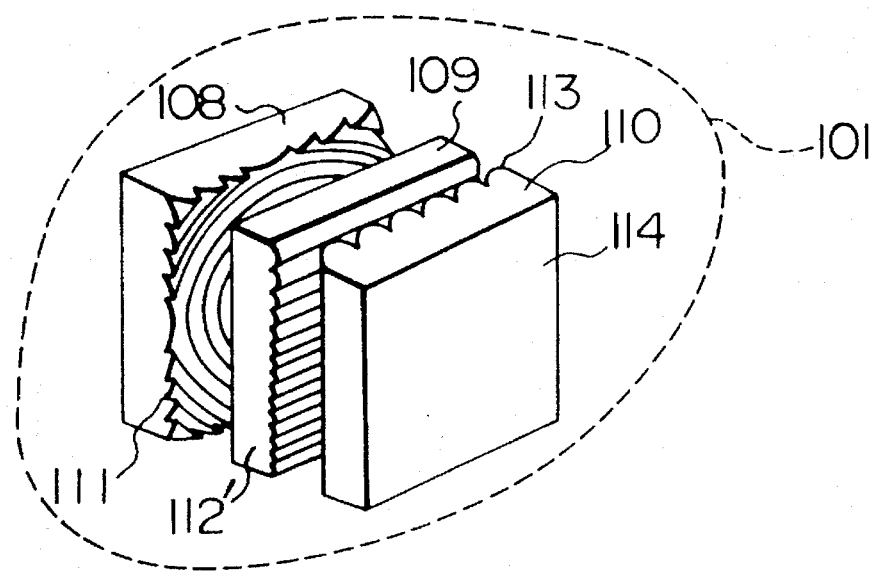
FIG. 24 is a perspective view showing another embodiment of a screen used by a display of this invention.

In the embodiment shown in FIG. 24 and its modifications, the pitch of the pitch-modulated lenticular lens means 112' or 112" may be set to zero (simple flat plane) at the area which requires only a narrowest diverging angle. This is because a light diffusing particle layer is provided to one of the sheets 108, 109, and 110 as described earlier with respect to the conventional technique so that this light diffusing particle layer supplies a lower vertical diverging angle limit. Another lenticular lens means having a diverging angle of about 10 degrees may be provided to the light input surface of the sheet 108 shown in FIG. 29 or to the light output surface of the sheet 109. With this arrangement, the sharp cut-ff of the vertical directivity characteristics (refer to FIG. 9) can be changed to a more gentle slope. The pitch of the vertical lenticular lens may be in the range from several tens μm to about 1 mm, and may be set smaller than a pixel size depending upon specific applications.

Figure 31:
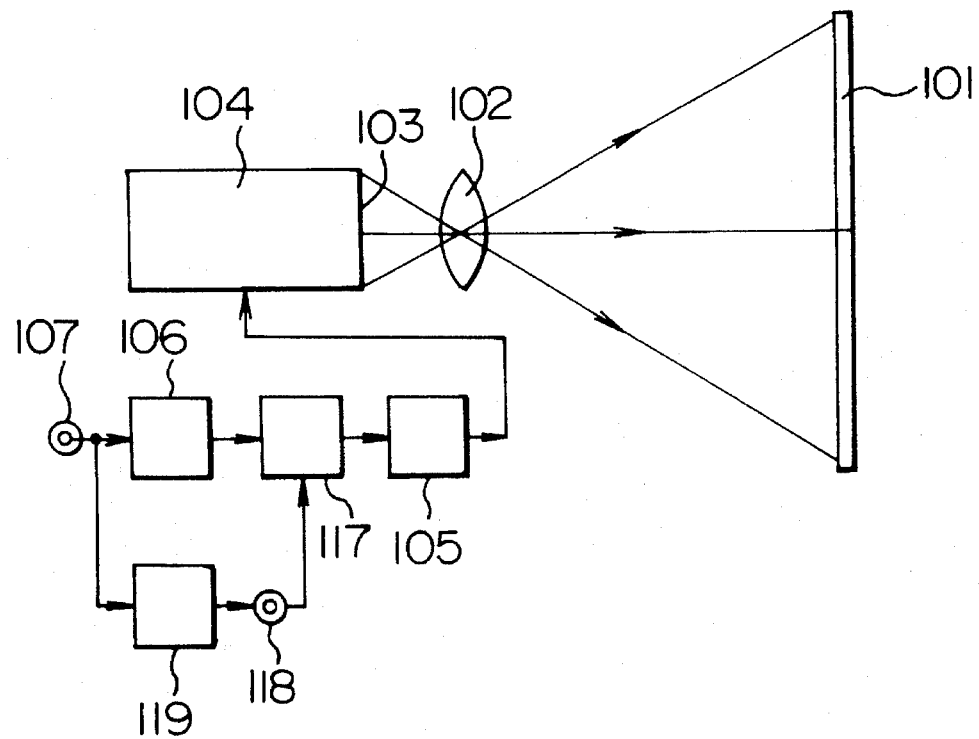
FIG. 31 is a schematic diagram showing the structure of a display according to another embodiment of the invention.

Another embodiment which is preferably used with the embodiment shown in FIG. 24, will be described. An electronic light density modulating means of this embodiment will be described first with reference to FIG. 31. In FIG. 31, elements other than elements 117, 118, and 119 are similar to those described earlier.

Figure 32:
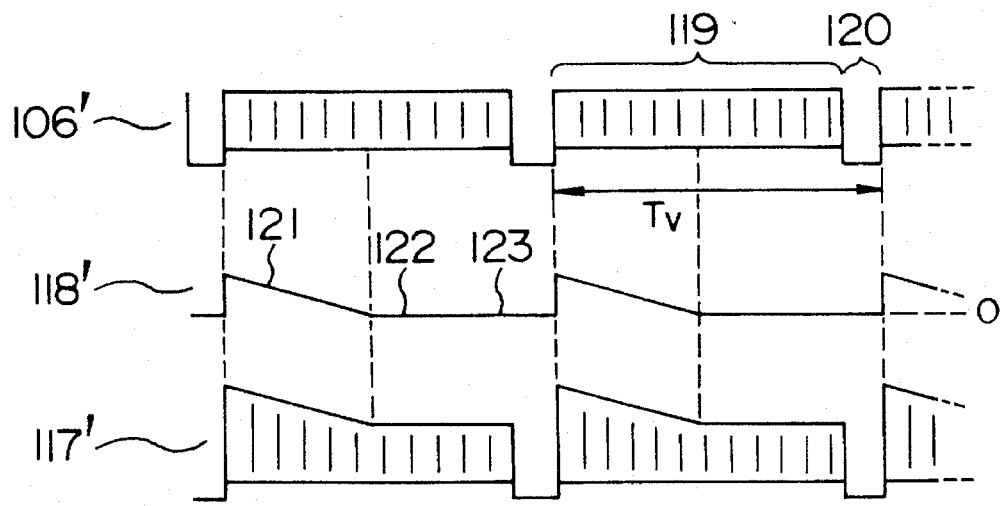
FIG. 32 shows waveforms explaining the operation of the embodiment shown in FIG. 31.

Reference numeral 117 represents an electronic light density modulating means which is a gain controller for controlling the gain in proportion to an input signal to a terminal 118. A block 119 is a combined circuitry of a synchronizing signal separator and a wave generator. The operation of the electronic light density modulating means will be described with reference to a signal waveform diagram shown in FIG. 32. In FIG. 32, an output signal waveform of the pre-amplifier 106 is indicated at 106', a signal waveform at the terminal 118 is indicated at 118', and an output waveform of the gain controller 117 is indicated at 117'. Reference numeral 119 indicates a vertical scan period, and reference numeral 120 indicates a vertical blanking period, the vertical scan period and the vertical blanking period constituting one vertical scan period Tv. The waveform at 121 corresponds to the top end of the screen, that at 122 corresponds to the screen half height, and that at 123 corresponds to the screen bottom end. In this example shown in FIG. 32, the gain is increased at the area from the screen top end to half height. In this manner, the gain performance of the screens shown in FIGS. 24, 25, 27, and 28 can be compensated.

The waveform 117' shown in FIG. 32 allows to increase the relative brightness at the screen top end, realizing a proper compensation suitable for a specific application.

The description of the electronic light density modulating means has thus completed.

Figure 33:
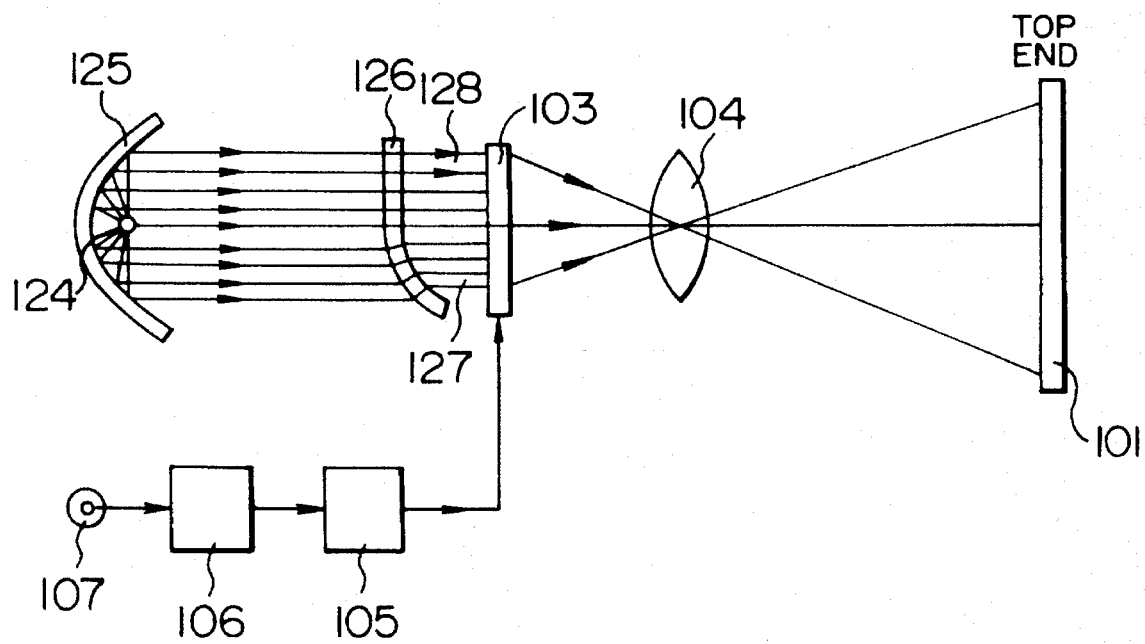
FIG. 33 is a schematic diagram showing the structure of a display according to another embodiment of the invention.

An example of an optical light density modulating means is illustrated in FIG. 33. In FIG. 33, elements other than elements 124 to 128 are similar to those described earlier. Reference numeral 103 represents a liquid crystal panel or a light bulb. Reference numeral 124 represents a light source, reference numeral 125 represents a reflection mirror, and reference numeral 126 represents a light density modulating means which is a glass plate whose lower half is a one-dimensional meniscus lens. Light beams outputted from the light density modulating means 126 are indicated by solid lines with arrows 128 at the screen top end and by solid lines with arrows 127 at the screen bottom end. As seen from FIG. 33, the density of the light beams at 127 can be increased more than that of the light beams at 128. The density can be further increased as the light density modulating means 126 is made thicker. With the structure shown in FIG. 33, the gain and brightness of the screen 101 at the top end can be compensated and prevented from lowering.

The embodiment shown in FIGS. 31 and 32 supplies a relatively large power only to the area at the screen top end so as to prevent the screen brightness from lowering. In this manner, a good performance can be obtained by keeping the total power consumption at the minimum.

Instead of using the one-dimensional meniscus lens means 126 shown in FIG. 33, the upper light emission area of the light source 124 may be made broader than the lower light emission area to change the light density.

With the structure of the invention, the screen horizontal directivity characteristics can maintain a diverging angle of 50 degrees or more to the right and left sides. The duty factor of the light transmissive part can be set to 40% or less and that at the black stripe part can be set to 60% or more, thereby improving a contrast and preventing a manufacturing yield from being lowered by a variation of molding conditions. Furthermore, the self-weight bucking of a lenticular sheet can be avoided.

Further, the polarizer means for passing only horizontally polarized light components can absorb about 50% of room illuminating ambient light applied to the screen, further improving the contrast.

Still further, the flare light preventing means further improves the contrast.

Furthermore, the polarizer means disposed between a screen and a room illuminating light source, for passing only vertically polarized light components, further improves the contrast of a reproduced image and reducing glares on the surface of a document on a desk.

Still further, the vertical diverging angle matching the distribution of viewer eyes can be set proper at each vertical position of a screen, and an addition of only a small power consumption prevents the screen brightness from being degraded. It is therefore possible to relieve a fatigue of viewer eyes and to provide a screen with a high commercial value.

What is claimed is:

1. A rear projection type display system comprising:

original image forming means;

projection lens means; and transmissive type screen means, said transmissive type screen means comprising at least a Fresnel sheet disposed on the light input side and a lenticular sheet disposed on the light output side, wherein said lenticular sheet is formed with a vertical-stripe lenticular lens surface on the light input side, said lenticular lens surface diverging light in the horizontal direction, a light intercepting convex part of said lenticular sheet is printed with black stripes on the light output side, and the width of each black stripe is set to 60% or more of an array pitch of said lenticular lens surface, and said transmissive type screen means further comprising transparent reinforcing plate means and transparent connective means, wherein said connective means integrally connects said reinforcing plate means to a light transmissive concave part of said lenticular sheet on the light output side while removing any air layer, and the total thickness of said lenticular sheet and said reinforcing plate means is set to a width satisfying a self-weight buckling prevention condition.

2. A rear projection type display system according to claim 1, further comprising polarizer means for passing only horizontally polarized light components, said polarizer means being integrally formed with said reinforcing plate means on the light input side.

3. A rear projection type display system according to claim 1, further comprising flare preventing means, said flare preventing means including polarizer means and quarter wavelength plate means disposed between said projection lens means and said original image forming means, and the birefringence fundamental axis direction of said quarter wavelength plate means is tilted by about 45 degrees from the direction of polarized light passing through said polarizer means.

4. A rear projection type display system according to claim 1, wherein a vertically-diffusing lenticular lens means is formed on the light input side of said reinforcing means, said vertically-diffusing lenticular lens means being integrally formed with said transmissive type screen means so as not to expose the lens portion of said vertically-diffusing lenticular lens means to the air.

5. A rear projection type display system according to claim 2, wherein polarizer means for passing only vertically polarized light is disposed between a room illuminating light source and said transmissive type screen means.

6. A rear projection type display system comprising:

original image forming means;

projection lens means; and transmissive type screen means, said transmissive type screen means comprising at least a Fresnel sheet disposed on the light input side and a lenticular sheet disposed on the light output side, wherein said lenticular sheet is formed with a vertical-stripe lenticular lens surface on the light input side, said lenticular lens surface diverging light in the horizontal direction, a light intercepting convex part of said lenticular sheet is printed with black stripes on the light output side, said transmissive type screen means further comprising transparent reinforcing plate means and transparent connective means, wherein said connective means integrally connects said reinforcing plate means to a light transmissive concave part of said lenticular sheet on the light output side while removing any air layer, and the total thickness of said lenticular sheet and said reinforcing plate means is set to a width satisfying a self-weight buckling prevention condition, and said transmissive type screen means further comprising a vertical lenticular lens for diverging light in the vertical direction, wherein said vertical lenticular lens is formed as pitch-modulated lenticular lens means, and the array pitch of said pitch-modulated lenticular lens means at the area where a broadest vertical diverging angle is required, is set to be 1.2 times or more of the array pitch at the area where a narrowest vertical diverging angle is required.

7. A rear projection type display system comprising:

original image forming means;

projection lens means;

transmissive type screen means; and light density modulating means, said transmissive type screen means comprising at least a Fresnel sheet, a horizontal lenticular lens for diverging light in the horizontal direction, and a vertical lenticular lens for diverging light in the vertical direction, wherein said vertical lenticular lens is formed as pitch-modulated lenticular lens means, the array pitch of said pitch-modulated lenticular lens means at the area where a broadest vertical diverging angle is required, is set to be 1.2 times or more of the array pitch at the area where a narrowest vertical diverging angle is required, and said light density modulating means increases a light density of said image forming means at the area where the broadest vertical diverging angle is required, more than a light density at the area where the narrowest vertical diverging angle is required.

8. A rear projection type display system according to claim 7, wherein said light density modulating means is a gain controller for controlling the amplitude of an image signal.

9. A rear projection type display system according to claim 7, wherein said light density modulating means is one-dimensional meniscus lens means.

* * * * *